No. 644,302. Patented Feb. 27, 1900.
B. F. REYNOLDS, Dec'd.
E. D. REYNOLDS, Administratrix.
GRATE.
(Application filed June 1, 1897. Renewed Jan. 18, 1900.)
(No Model.) 2 Sheets—Sheet 1.
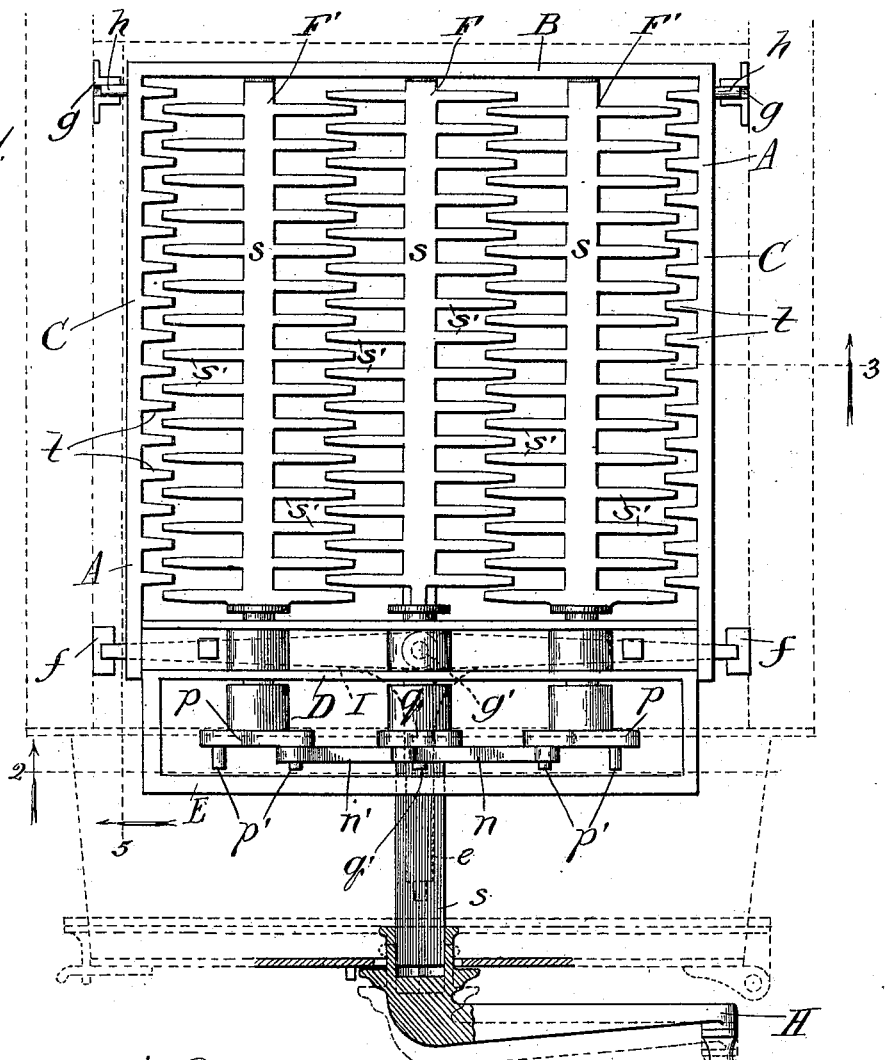
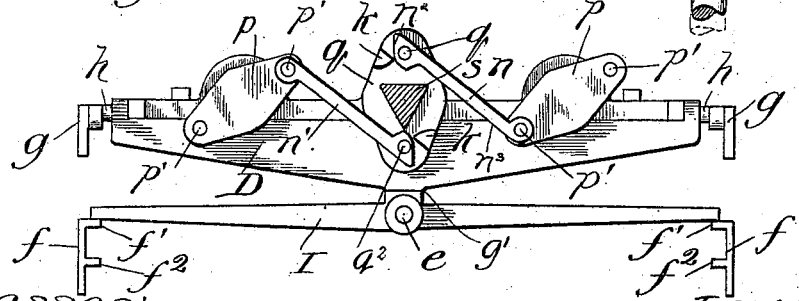
Witnesses:
Inventor:
Benjamin F. Reynolds,
By Dyrenforth & Dyrenforth,
Att'ys.

No. 644,302. B. F. REYNOLDS, Dec'd. Patented Feb. 27, 1900.
E. D. REYNOLDS, Administratrix.
GRATE.
(Application filed June 1, 1897. Renewed Jan. 18, 1900.)
(No Model.) 2 Sheets—Sheet 2.
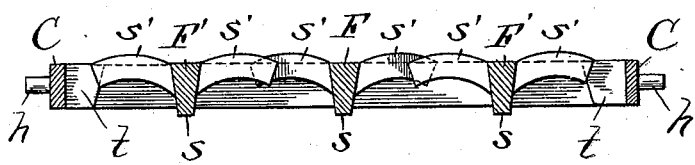
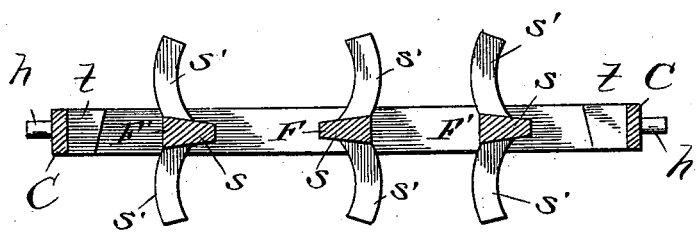
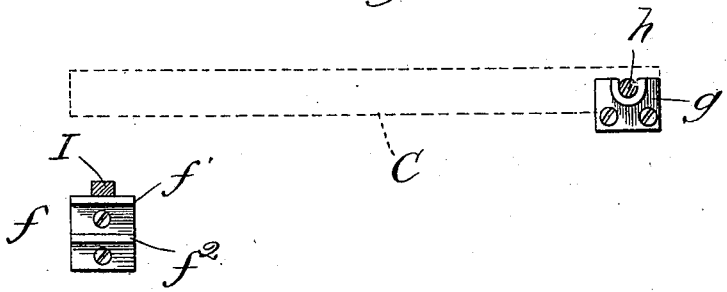
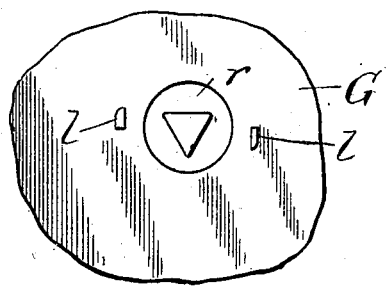
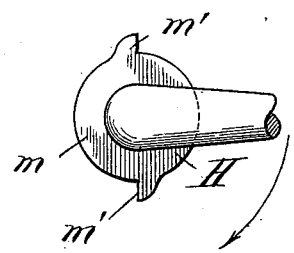
Witnesses:
Inventor:
Benjamin F. Reynolds,

UNITED STATES PATENT OFFICE.

BENJAMIN F. REYNOLDS, OF CHICAGO, ILLINOIS; ELLEN D. REYNOLDS, ADMINISTRATRIX OF SAID BENJAMIN F. REYNOLDS, DECEASED, ASSIGNOR TO THE B. F. REYNOLDS & COMPANY, OF SAME PLACE.

GRATE.

SPECIFICATION forming part of Letters Patent No. 644,302, dated February 27, 1900.

Application filed June 1, 1897. Renewed January 18, 1900. Serial No. 1,920. (No model.)

*To all whom it may concern:*

Be it known that I, BENJAMIN F. REYNOLDS, a citizen of the United States, residing at Chicago, in the county of Cook and State of Illinois, have invented a new and useful Improvement in Grates, of which the following is a specification.

My invention has for its object the provision of a dumping-grate of improved construction for furnaces generally, in the use of which the operation of freeing the combustion-chamber primarily of the finer ashes only and when desired of cinders and clinkers also may be performed more easily and effectively than with grates hitherto constructed to subserve the same purpose; and to this end my invention consists in the peculiar construction of the grate-support whereby the grate may be lowered bodily at one end; and it still further consists in various details of construction and combinations of parts, all hereinafter more fully set forth and pointed out in the claims.

While my improvement is applicable with slight modifications to furnaces generally, it is particularly desirable for cooking-ranges and house-heating stoves or furnaces whether of the air-heating or hot-water or steam circulating types, and without intending thereby to limit my invention to use with any particular class of furnaces the drawings illustrate and the specification will describe the grate in connection with a household-furnace only for the sake of brevity and convenience.

Referring to the drawings, Figure 1 is a top plan view, partly broken and sectional, of a rectangular grate of my improved construction, certain hidden parts and the furnace, all but a part of the door, which is in section, being indicated for purposes of illustration by dotted lines; Fig. 2, a section taken on the line 2 2 of Fig. 1 and viewed in the direction of the arrows; Fig. 3, a section taken on line 3 3 of Fig. 1 and viewed in the direction of the arrows; Fig. 4, a view similar to Fig. 3, showing the grate-sections upset; Fig. 5, a section taken on line 5 5 of Fig. 1 and viewed in the direction of the arrows, showing the grate-supports, the adjacent edge of the grate-frame being indicated by dotted lines; Fig. 6, an enlarged broken view in elevation of a portion of the surface of the furnace-door, showing the opening for the insertion of the crank employed to rock the grate-sections; and Fig. 7 a broken view of the crank. The outlines of the furnace walls and door are indicated by dotted lines.

A is the frame of the grate, comprising the rear bar B, the side bars C C, provided along their inner sides with teeth $t$, the forwardly-located cross-bar D, and the front bar E.

The grate shown is formed of three parallel rocking sections F F' F', each comprising a central bar $s$, shaped toward opposite ends to afford journals which at the rear end extend into bearings in the rear bar B and toward the forward end extend through bearings in the cross-bar D. The bars $s$ may be shaped in cross-section, as shown in Figs. 3 and 4, with converging sides, making the bars narrower at the lower than at their upper edges, and are provided on opposite sides with teeth $s'$. The teeth $s'$ of the sections F' are in corresponding positions, and the outer teeth of each interlap with the teeth $t$ on the side bars. The teeth of the section F are arranged to interlap with the inner teeth of the sections F', and all the teeth $s'$ are of concavo-convex form, the convex sides being at the top. The bar $s$ of the section F extends forward through the bar E and through an opening $r$ in the door G of the ash-pit of the furnace to extend with its end flush or approximately flush with the outer side of the door when the latter is closed. Upon the bar $s$ of the section F and between the bars D and E is a transverse plate $q$ affording arms, toward the outer ends of which are studs $q'$ $q^2$, and in line with the plate $q$, upon the ends of the bars $s$ of the sections F', are transverse heads $p$, also affording arms provided toward their outer ends with studs $p'$. The grate-sections are connected to rock simultaneously by joining the studs in pairs by means of pivotally-mounted links $n$ $n'$, the stud $q'$ being joined with the adjacent stud $p'$ on the section to the right and the stud $q^2$ with the adjacent stud $p'$ on the left-hand section. The connection is such as to cause the teeth of the side sections to extend parallel with those of the central section when the latter is in its horizontal position; but when the middle section is rocked in one direction the side sections are rocked simultaneously therewith in the opposite direction.

H is a crank which is arranged to pass through the opening $r$ of the door G and fit the end of the bar of the section F, which is made angular to receive it. The opening $r$ is just large enough to permit ready insertion of the end of the crank, and near its end the crank is provided with a flange $m$, which closes the opening and prevents the escape of dust when the furnace is shaken down, as hereinafter described. Projecting from the face of the door G adjacent to the opening $r$ are studs $l$, and upon the outer edge of the flange $m$ of the crank are two radial projections $m'$, located diagonally opposite each other, which are intended to limit the movement of the crank by striking against the studs $l$. Upon the face of the transverse plate $q$ are two stops $k$, which in the turning of the plate strike alternately against the ends $n^2$ and faces $n^3$ of the respective links and limit the turning of the sections to the horizontal position shown in Fig. 3 in one direction and to the vertical position shown in Fig. 4 in the other direction.

In operation when it is desired to shake down the furnace the crank H is placed upon the end of the section F. The location of the studs $l$ upon the door G with relation to the direction of the angles of the squared end of the bar $s$ of the section F and the location of the projections $m'$ with relation to the angles of the socket in the crank H, which fits over the end of the said bar, are such as to cause the projections $m'$ in the turning of the crank to strike the studs $l$ when the sections have been turned such a distance from the horizontal position as to cause the interlapping teeth to rock apart to the point of separation, but no farther. Thus, as the crank is turned back and forth, the adjacent toothed edges of the grate-sections rise and fall correspondingly, producing an undulating movement of the surface of the grate, which, while it agitates the coals and ashes in the furnace, will only allow the finer particles of the latter, such as are capable of passing between the teeth of the sections when the latter are in horizontal position, to fall to the ash-pit, and as the adjacent edges of the sections do not separate, there can be no danger of coals or clinkers lodging between them to interfere with their rocking. The bars $s$ being widest along the top, as described, no particles of ashes which enter between the teeth will be able to lodge upon the sides of those bars to obstruct the draft to the fire-chamber. The outwardly-tapering shape, as shown, of the teeth also facilitates the sifting through of the ashes. The rocking movement of the grate stirs up the coals and ashes equally throughout and tends to maintain equal combustion at all points.

When it is desired to upset the sections of the grate, as shown in Fig. 4, to discharge all the contents of the fire-chamber, the crank H is withdrawn to move the flange $m$ a short distance away from the door without disengaging the crank from the bar $s$, as shown by dotted lines in Fig. 1, whereby in its turning the projections $m'$ will pass over the studs $l$, when the upsetting may be performed without hindrance, the turning movement in this case being limited by the engagement of the links $n$ $n'$ with the stops $k$ upon the transverse plate $q$.

In large furnaces where it is necessary to employ more than three rocking sections the additional sections may be linked to the heads $p$ of the sections F', so that those lying adjacent will rock in contrary directions and the alternate ones in the same direction.

To provide for dropping the grate down at the front end in the event of its becoming necessary at any time to remove clinkers which will not pass between the grate-bars or when for any reason it becomes desirable to repair the grate or fire-chamber, the side bars C are provided near the rear end of the grate-frame with trunnions $h$, which rest in socket-bearings $g$ on the wall of the furnace. Below the cross-bar D and pivotally secured to the center of the latter at $g'$ to swing in a plane parallel with said bar is a bar I, which extends beyond the sides of the grate-frame to rest on supports $f$ on the wall of the furnace, which are each formed with two steps $f'$ $f^2$. Extending centrally forward from the bar I is a rigid branch or lever arm $e$.

When it is desired to lower the front side of the grate, it is first raised through the medium of the handle H and then the lever-arm $e$ is turned, (which may be done more easily by fitting a suitable handle upon the bar to increase the leverage,) thus turning the swiveled bar I until its ends may be lowered past the steps $f'$ to the steps $f^2$. If it is desired to lower the grate still farther, the arm $e$ may be dropped to the bottom of the ash-pit. The grate may be swung up into position again by raising the arm and turning it to cause the ends of the bar I to rest upon the steps $f'$.

I desire to be understood as in no sense limiting myself in matters of detail by the particular description given above, except as shall appear from the appended claims.

What I claim as new, and desire to secure by Letters Patent, is—

1. In a furnace, the combination of a grate-frame A pivotally mounted at its rear end to swing at its forward end in a vertical plane, fixed supports at opposite sides of the forward end of the grate-frame, said supports being in different planes, and a horizontally-disposed bar I upon which the grate-frame is mounted at the center of its forward end arranged to be shifted to engage either of said supports at will, substantially as described.

2. In a furnace, the combination of a grate-frame pivotally mounted toward its rear end on laterally-extending trunnions, fixed supports at opposite sides of the forward end of the grate-frame said supports being in different planes, a horizontally-disposed bar provided with an upwardly-projecting stud upon which the grate-frame is mounted at its forward end, and a forwardly-extending branch arm connected to the center of said bar serving as a means for swinging said bar in a horizontal plane to permit it to be shifted from one support to another, substantially as and for the purpose set forth.

BENJAMIN F. REYNOLDS.

In presence of—
R. T. SPENCER,
J. H. LEE.